US011128170B1

(12) United States Patent
Guedon

(10) Patent No.: US 11,128,170 B1
(45) Date of Patent: Sep. 21, 2021

(54) HARDWARE AND METHOD FOR ENHANCED WIRELESS RECEIVER OUTPUT POWER

(71) Applicant: STMicroelectronics Asia Pacific Pte Ltd, Singapore (SG)

(72) Inventor: Yannick Guedon, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 16/897,429

(22) Filed: Jun. 10, 2020

(51) Int. Cl.
| | | |
|---|---|---|
| H02J 50/10 | (2016.01) | |
| H02J 50/80 | (2016.01) | |
| H04B 5/00 | (2006.01) | |
| H01F 38/14 | (2006.01) | |
| H02J 50/40 | (2016.01) | |

(52) U.S. Cl.
CPC ............ H02J 50/10 (2016.02); H01F 38/14 (2013.01); H02J 50/40 (2016.02); H02J 50/80 (2016.02); H04B 5/0037 (2013.01); *H01F 2038/143* (2013.01)

(58) Field of Classification Search
CPC .................................. H02J 50/00; H04B 5/00
See application file for complete search history.

(56) References Cited

U.S. PATENT DOCUMENTS

| | | | |
|---|---|---|---|
| 8,698,350 B2 | 4/2014 | Kanno | |
| 9,035,499 B2 | 5/2015 | Kesler et al. | |
| 10,103,577 B2 | 10/2018 | Van Wageningen et al. | |
| 2017/0077738 A1* | 3/2017 | Park | ......................... H01F 27/36 |
| 2018/0212469 A1* | 7/2018 | Liu | ......................... H02J 50/80 |
| 2018/0212470 A1 | 7/2018 | Leem | |

FOREIGN PATENT DOCUMENTS

CN 109861353 A 6/2019

OTHER PUBLICATIONS

Fu, Minfan, et al: "Compensation of Cross Coupling in Multiple-Receiver Wireless Power Transfer Systems," Final Manuscript for IEEE Transactions on Industrial Informatics, Jan. 10, 2016 (9 pages).

* cited by examiner

*Primary Examiner* — Adi Amrany
(74) *Attorney, Agent, or Firm* — Crowe & Dunlevy

(57) ABSTRACT

A power transmission system includes at least one wireless power transmission circuit. A first wireless power reception circuit includes a first circuit comparing a reference voltage to a feedback voltage representing an output voltage produced from received power and delivered to an output node, and adjusting a first control terminal of a device supplying a first rectified voltage until the feedback and reference voltages are equal. A second wireless power reception circuit includes a second circuit modifying a control terminal of a device sourcing a second rectified current produced from received power to the output node, based upon comparison of a reference current to a current representative of the second rectified current. Control circuitry adjusts the reference current until a first rectified voltage generated by the first wireless power reception circuit and a second rectified voltage generated by the second wireless power reception circuit are equal.

16 Claims, 6 Drawing Sheets

HARDWARE AND METHOD FOR ENHANCED WIRELESS RECEIVER OUTPUT POWER

TECHNICAL FIELD

This disclosure is directed to the field of wireless power transmission and, in particular, to hardware, operating techniques for the hardware, and methods for increasing the amount of power transmittable in a given unit of time via wireless power transmission.

BACKGROUND

Portable electronic devices, such as smartphones, smartwatches, audio output devices (earbuds, headphones), and wearables operate on battery power, and not from wired power transmitted thereto over wired transmission lines and distribution systems. The batteries used for such devices are typically rechargeable and, therefore, a way to recharge the power of such batteries is necessary.

Most portable electronic devices include a charging port, typically conforming to the Micro USB or USB-C standards, into which a power cord connected to a power source can be inserted to provide for recharging of their batteries. However, such charging ports may make it difficult to enhance the water resistance of the electronic device, and are subject to damage from repeated use. In addition, some smaller portable electronic devices (for example, earbuds and smartwatches) lack the available space to provide for a charging port. Still further, some users may find it cumbersome to plug a power cord into the charging port of an electronic device to charge the battery of that device.

Therefore, to address these issues, wireless power transmission has been developed. Wireless power transmission systems utilize a coil transmitter (a primary), driven by electric power from a power source (typically a wired connection, but in some cases a battery), that generates a time-varying electric field, and a coil receiver (a secondary) in which the time-varying electric field induces a current. Receiver hardware extracts the power transmitted to the coil receiver, and provides it to a load, such as the battery of the electronic device into which the coil receiver and receiver hardware are incorporated.

Standards governing the hardware and how the transmitter and receiver communicate have been developed, allowing for easy implementation of wireless charging into electronic devices. However, existing wireless transmission standards can only transfer a limited amount of power, which may be insufficient or undesirable in some situations where it is desired to transmit an increased amount of power per unit of time. As such, despite the existence of well-established and well-functioning wireless transmission standards, further development into this area is still needed.

SUMMARY

Disclosed herein is a wireless power transmission system including at least one wireless power transmission circuit, a first wireless power reception circuit, a second wireless power reception circuit, and control circuitry. Note that the first wireless power reception circuit is a master and that the second wireless power reception circuit is a slave, and that there may be multiple slaves. However, for brevity, in this summary section, just one second wireless power reception circuit (slave) is described.

The first wireless power reception circuit has a first amplifier circuit configured to compare a reference voltage to a feedback voltage representative of an output node voltage produced from power received from the at least one wireless power transmission circuit, and adjust a first transistor supplying a first rectified voltage until the feedback voltage is equal to the reference voltage, with a first rectified current being delivered to the output node.

The second wireless power reception circuit has a second amplifier circuit configured to modify a gate bias for a second transistor sourcing a second rectified current produced from power received from the at least one wireless power transmission circuit to thereby modify the second rectified current, based upon a comparison of a reference current to a current representative of the second rectified current, with the second rectified current being delivered to the output node.

The control circuitry is configured to adjust the reference current until a first rectified voltage generated by the first wireless power reception circuit and a second rectified voltage generated by the second wireless power reception circuit are equal.

The first wireless power reception circuit may also include a first capacitor across which the first rectified voltage forms, and the second wireless power reception circuit may also include a second capacitor across which the second rectified voltage forms.

The first amplifier circuit may also include a first n-channel transistor having a drain coupled to receive the first rectified voltage, a source coupled to an output node, and a gate. The first amplifier circuit may also include a voltage divider coupled between the output node and ground, and a first amplifier having a non-inverting terminal coupled to the reference voltage, an inverting terminal coupled to a tap of the voltage divider to receive the feedback voltage, and an output coupled to the gate of the first n-channel transistor.

The second amplifier circuit may include a second n-channel transistor having a drain coupled to the second rectified voltage, a source coupled to the output node, and a gate. The second amplifier circuit may also include a second amplifier having a non-inverting terminal coupled to receive the current representative of the second rectified current, an inverting terminal coupled to receive the reference current, and an output coupled to the gate of the second n-channel transistor.

An equalizer switch controlled by the control circuitry may selectively couple the first rectified voltage to the second rectified voltage when the control circuitry is unable to adjust the reference current until the feedback voltage is equal to the reference voltage and the current representative of the second rectified current is equal to a reference current.

The first amplifier may be a low dropout amplifier.

The control circuitry may adjust the reference current until the first rectified voltage and the second rectified voltage are equal by: requesting that the at least one power transmission circuit transmit, to the first wireless power reception circuit, a portion of power it is capable of transmitting; and adjusting the reference current until a first balance point, at which the first and second rectified voltages are equal are reached. The reference current may be adjusted until the first balance point by: requesting that the at least one power transmission circuit increase the portion of its power that it is transmitting to the first wireless power reception circuit, if the first rectified voltage is greater than an output voltage at the output node and if the output voltage is greater than the second rectified voltage; increasing a magnitude of the reference current if the second rectified voltage is greater than the first rectified voltage and the first rectified voltage is greater than the output voltage; and decreasing the magnitude of the reference current if the first rectified voltage is greater than the second rectified voltage and the second rectified voltage is greater than the output voltage.

The control circuitry may adjust the reference current until the first rectified voltage and the second rectified voltage are equal by additionally: requesting that the at least one power transmission circuit transmit, to the second wireless power reception circuit, a portion of power it is capable of transmitting; and adjusting the reference current until a second balance point, at which the first and second rectified voltages are equal.

The reference current may be adjusted until the second balance point is reached by: increasing a magnitude of the reference current, if the second rectified voltage is greater than the first rectified voltage and the first rectified voltage is greater than the output voltage; and decreasing the magnitude of the reference current if the first rectified voltage is greater than the second rectified voltage and the second rectified voltage is greater than the output voltage.

The control circuitry may adjust the reference current until the first rectified voltage and the second rectified voltage are equal by additionally: requesting that the at least one power transmission circuit transmit, to the first and second wireless power reception circuits, all of power it is capable of transmitting; and adjusting the reference current until a third balance point, at which the first and second rectified voltages are equal. The reference current may be adjusted until the third balance point is reached by: increasing a magnitude of the reference current, if the second rectified voltage is greater than the first rectified voltage and the first rectified voltage is greater than the output voltage; and decreasing the magnitude of the reference current if the first rectified voltage is greater than the second rectified voltage and the second rectified voltage is greater than the output voltage.

DETAILED DESCRIPTION

The following disclosure enables a person skilled in the art to make and use the subject matter disclosed herein. The general principles described herein may be applied to embodiments and applications other than those detailed above without departing from the spirit and scope of this disclosure. This disclosure is not intended to be limited to the embodiments shown, but is to be accorded the widest scope consistent with the principles and features disclosed or suggested herein.

Figure 1:
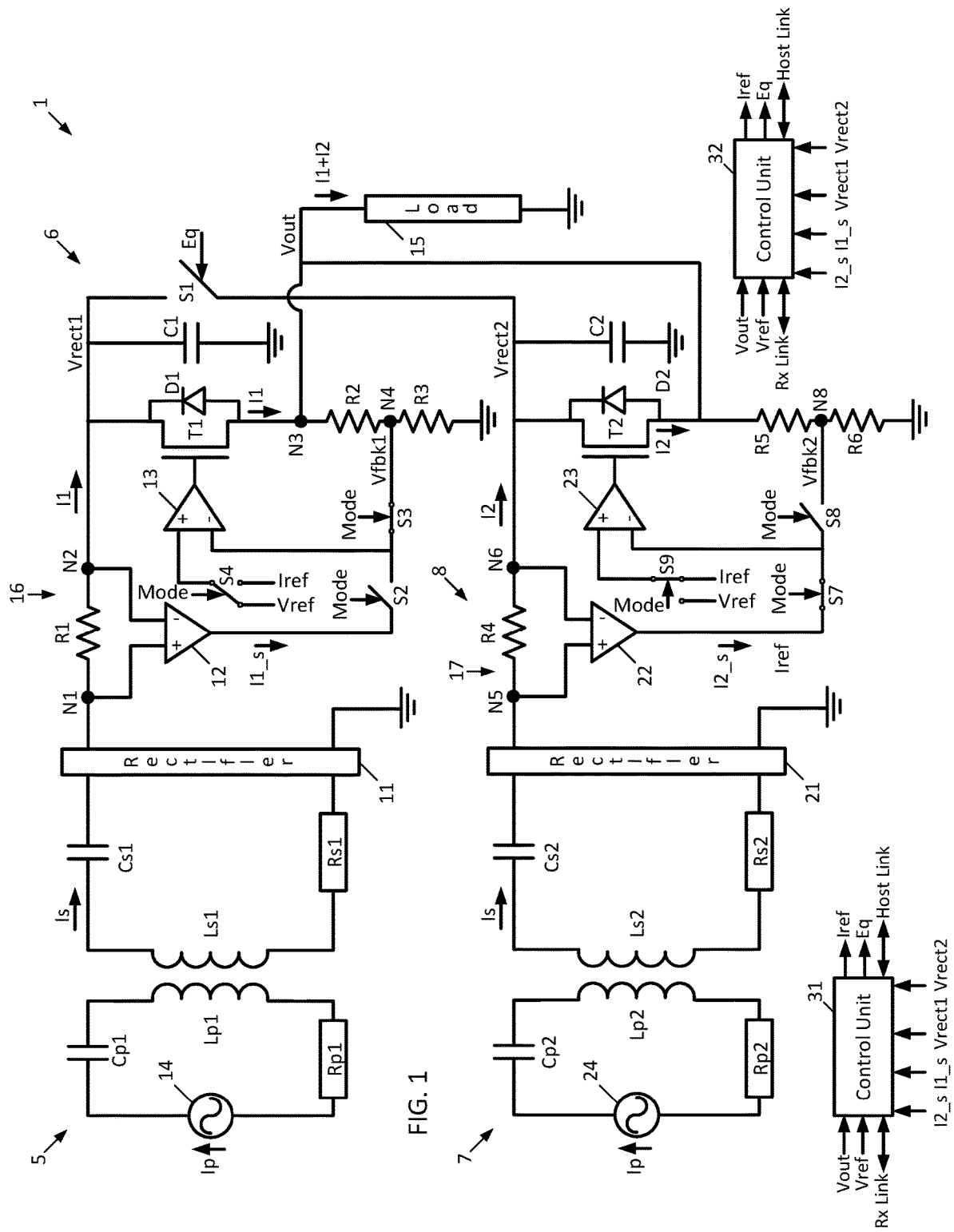
FIG. 1 is a schematic diagram of a first wireless power transmission system disclosed herein in which two transmitters transmit power to two receivers operating in parallel.

Now described with reference to FIG. 1 is an embodiment of wireless transmission system 1 in which first and second transmitters 5 and 7, respectively, wirelessly transmit power to first and second receivers 6 and 8, respectively, operating in parallel. First, the hardware itself will be described, and thereafter, the operation of the hardware will be described.

A. Hardware of Wireless Power Transmission System 1

The transmitter 5 is comprised of an AC power source 14 connected to a primary coil (schematically represented by capacitance Cp in series with inductor Lp1 and resistance Rp1).

The receiver 6 is comprised of a secondary coil (schematically represented by capacitance Cs1 in series with inductor Ls1 and resistance Rs1) connected to a rectifier 11 that rectifies an AC current Is output by the secondary coil to produce a DC output current I1. The inputs of the rectifier 11 are connected to the secondary coil, and the output of the rectifier 11 is coupled between node N1 and ground.

A current sensor 16 is coupled between nodes N1 and N2 and configured to sense the current I1 output by the rectifier 11. The current sensor 16 is comprised of a resistor R1 coupled between nodes N1 and N2, and an amplifier 12. The amplifier 12 has a non-inverting terminal coupled to node N1 and an inverting terminal coupled to node N2. The output of the amplifier 12 is a first sense current $I1\_s$, which is representative of the current I1 output by the rectifier 11. The output of the amplifier 12 is selectively connected to the inverting terminal of amplifier 13 through switch S2 which is controlled by the mode signal Mode.

An n-channel MOSFET transistor T1 has its drain connected to node N2, its source connected to node N3, and its gate connected to be biased by the output of amplifier 13. The amplifier 13 has its non-inverting terminal selectively connected to either a reference voltage Vref or a reference current Iref via a switch S4 that is controlled by the mode signal Mode, and has its inverting terminal selectively connected to node N4 through a switch S3 that is controlled by the Mode signal.

A resistor R2 is connected between nodes N3 and N4, and a resistor R3 is connected between nodes N4 and ground. A load 15 (for example, a battery of an electronic device into which the receivers 6 and 8 are incorporated) is connected between node N3 and ground. A capacitor C1 is connected between node N2 and ground, and a first rectified voltage Vrect1 forms across the capacitor C1.

Note that the switch S2, S3, and S4 in the receiver 6 all operate based upon the mode signal Mode, but operate differently. When the mode signal Mode indicates that the receiver 6 is to operate based on an output voltage control mode (hereinafter referred to as voltage feedback), the mode signal Mode serves to open switch S2, close switch S3 to receive the feedback voltage Vfbk1 from node N4 and set switch S4 so as to connect the non-inverting terminal of the amplifier 13 to the reference voltage Vref. On the other hand, when the mode signal Mode indicates that the receiver 6 is to operate based on output current control mode (hereinafter referred to as current feedback), the mode signal Mode serves to close switch S2, open switch S3, and set switch S4 so as to connect the non-inverting terminal of the amplifier 13 to the reference current Iref.

The transmitter 7 is further comprised of an AC power source 24 connected to a primary coil (schematically represented by capacitance Cp2 in series with inductor Lp2 and resistance Rp2).

The receiver 8 is further comprised of a secondary coil (schematically represented by capacitance Cs2 in series with inductor Ls2 and resistance Rs2) connected to a rectifier 21 that rectifies an AC current Is output by the secondary coil to produce a DC output current I2. The inputs of the rectifier 21 are connected to the secondary coil, and the output of the rectifier 21 is coupled between node N5 and ground.

A current sensor 17 is coupled between nodes N5 and N6 and configured to sense the current I2 output by the rectifier 21. The current sensor 17 is comprised of a resistor R4 coupled between nodes N5 and N6, and an amplifier 22. The amplifier 22 has a non-inverting terminal coupled to node N5 and an inverting terminal coupled to node N6. The output of the amplifier 22 is a second sense current $I2\_s$, which is representative of the current I2 output by the rectifier 21. The output of the amplifier 22 is selectively connected to the inverting terminal of amplifier 23 through switch S7 which is controlled by the mode signal Mode.

An n-channel transistor T2 has its drain connected to node N6, its source connected to node N3, and its gate connected to be biased by the output of amplifier 23. Note that instead of the n-channel transistor T2, any three terminal device or combination of devices may be used.

A resistor R5 is connected between node N3 and N8, and a resistor R6 is connected between node N8 and ground.

The amplifier 23 has its non-inverting terminal selectively connected to a reference current Iref via a switch S9 that is controlled by the mode signal Mode, and has its inverting terminal connected to selectively receive the current $I2\_s$ from the output of the amplifier 22 through a switch S7 that is controlled by the mode signal Mode, or selectively connected to receive the feedback voltage Vfbk2 from node N8 through a switch S8 that is controlled by the mode signal Mode.

A capacitor C2 is connected between nodes N6 and ground, and a second rectified voltage Vrect2 forms across the capacitor C2.

Note that the switches S7, S8, and S9 in the receiver 8 all operate based upon the mode signal Mode, but operate differently. When the mode signal Mode indicates that the receiver 8 is to operate based on voltage feedback, the mode signal Mode serves to open switch S7, close switch S8, and set switch S9 so as to connect the non-inverting terminal of the amplifier 23 to the reference voltage Vref. On the other hand, when the mode signal Mode indicates that the receiver 8 is to operate based on current feedback, the mode signal Mode serves to close switch S7, open switch S8, and set switch S9 so as to connect the non-inverting terminal of the amplifier 23 to the reference current Iref.

A person skilled in the art will notice that in voltage feedback, the elements 13, T1, R2, R3, S2, S3, S4 (and their respective counterparts 23, T2, R5, R6, S7, S8, S9) are forming a conventional voltage regulator configuration represented here using n-channel MOSFET. However, this function could also be realized using a p-channel LDO conventional structure. A p-channel transistor T1 would have its drain connected to node N3, its source connected to node N2, and its gate connected to be biased by the output of amplifier 13 for which the positive and negative inputs would be swapped. A p-channel transistor structure would also accommodate the current feedback functionality. And more broadly, any receiver realized for being configurable between voltage control mode (conceptually a voltage source) and output current control mode (conceptually a current source) could be used to realize the disclosures herein.

A switch S1, operated by a control signal Eq, is connected between nodes N2 and N6. When the switch S1 is closed, Vrect1 and Vrect2 equalize.

A control unit 31 receives the reference voltage Vref, the output voltage Vout, the first rectified voltage Vrect1, the second rectified voltage Vrect2, the first rectified current $I1\_s$, and the second rectified current $I2\_s$, and from them generates the reference current Iref and the control signal Eq for the switch S1.

A control unit 32 receives the reference voltage Vref, the first rectified voltage Vrect1, the second rectified voltage Vrect2, the first rectified current $I1\_s$, and the second rectified current $I2\_s$, and from them generates the reference current Iref and the control signal Eq for the switch S1.

Note that there may be but one control unit 31 or 32, or that both control units 31 and 32 are present. When both control units 31 and 32 are present, each is associated with one of the receivers 6 or 8. As will be explained below, one receiver 6 or 8 operates as a master, while the other receiver 8 or 6 operates as a slave. In the case where both control units 31 and 32 are present, the control unit 31 or 32 associated with the receiver 6 or 8 designated as the master is operational, while the other control unit idles.

The Master control unit (not idle) is in charge of directly controlling Vref for the Master and Iref for the Slave and asking for power increase/decrease for both transmitters.

In case of in-band communication, despite a control unit being idle as a Slave, it may be requested by the Master control unit to wake-up and communicate (ASK modulation in Qi standard for example) with the associated transmitter for adjusting power, simply because the Master control unit do not have access to the physical communication link to the transmitter. This may not be used in the case of out-of-band communication.

B. Operation of Wireless Power Transmission System 1

1. General Description of Operation

In operation, one of the receivers 6 or 8 operates in a voltage mode feedback loop as a "master", while the other operates in a current mode feedback loop as a "slave". As illustrated in FIG. 1, the receiver 6 is operating as the master, while the receiver 8 is operating as the slave. In particular, the receiver 6 (operating as the master) sets and controls the rectified output voltage Vout (conceptually as a voltage source would do), while the receiver 8 (operating as the slave) increases the power delivered (conceptually as a current source would do) at that output voltage Vout.

In greater detail, the amplifier 13, transistor T1, and resistors R2 and R3 form a voltage regulator. The amplifier 13 compares the reference voltage Vref to a feedback voltage Vfbk1 at node N4, and modulates the bias applied to the gate of the n-channel transistor T1 such that the feedback voltage Vfbk1 is equal to Vref. This has the effect of modulating the current I1 supplied by the transistor T1 to the load to maintain the output voltage Vout at a set, stable voltage.

The receiver 8 operates in a current mode loop as a "slave" by adding the current I2 to the output current I1 of the receiver 6, without changing the voltage Vout. The parameters of the system are linked through the following relationships:

$$Vout = Vref \text{ and } I1 = Vout/Rload - Iref.$$

The control unit 31 monitors Vrect1 and Vrect2, and adjusts Iref such that, when the amplifier 23 modulates the bias voltage on the gate of the n-channel transistor T2 to maintain the current $I2\_s$ as being equal to the reference current Iref, the second rectified voltage Vrect2 matches the first rectified voltage Vrect1. When Vrect1 and Vrect2 match, then I1 and I2 are governed by I2=Iref and I1=Vout/Rload−Iref with $$Iref = \frac{\alpha.k2/k1}{1+\alpha.k2/k1} \frac{Vref}{Rl}.$$

k1 (and respectively k2) represent the power transfer factor from TX1 to RX1 (resp. TX2 to RX2), and α represents the ratio between the amount of power P2 provided by TX2 and the amount of power P1 provided by TX1, such that P2=α.P0 while P1=P0. For the system to reach the equilibrium point (Vrect1=Vrect2), the overall incoming power P1+P2=(1+α)P0 should be sufficient so that Vout can reach Vref while delivering $Vref^2$/Rload. In case the incoming power is not enough, the system would alter the parameters Iref & Vref so as to comply with the relationship tying up the two parameters. It is to be highlighted that in case k1=k2 and α=1, Iref=2×I1=2×I2=Vout/(2.R1).

The receivers 6 and 8 each contribute to providing power to the load 15 at the output voltage Vout, effectively increasing the power provided to the load 15 over the case where but one of the receivers 6 or 8 is operational.

If it is impossible during a given operational condition (for example—but not only—in situations where the incoming power is too low), to sufficiently adjust Iref—for a given Vref—such that Vrect2 is substantially equal to Vrect1, the control unit 31 may assert the equalization signal Eq to thereby close switch S1, shorting nodes N2 and N6, thereby resulting in Vout possibly moving away from target and some current possibly flowing from Vrect1 to Vrect2 (or vice versa) through S1.

The current flowing from one of the two Vrect voltages (Vrect1, Vrect2) to the other can be read through the current sensors, and both and Vout information (captured by Vout voltage measurement) can be used by the system to understand on which parameter to play with for reaching the steady operation. Ultimately the steady operation is governed by:

$$Iref = \frac{\alpha.k2/k1}{1+\alpha.k2/k1} \frac{Vref}{Rl}.$$

When P0, Iref, and Vref set properly, it would result to zero current flowing through the switch S1, and system being able to release the Equalization.

The operations performed by the receiver 6 are instead performed by the receiver 8 if the receiver 8 is instead configured as the master, and the operations performed by the receiver 8 are instead performed by the receiver 6 if the receiver 6 is instead configured as the slave.

2. Detailed Description of Operation

Figure 2A:
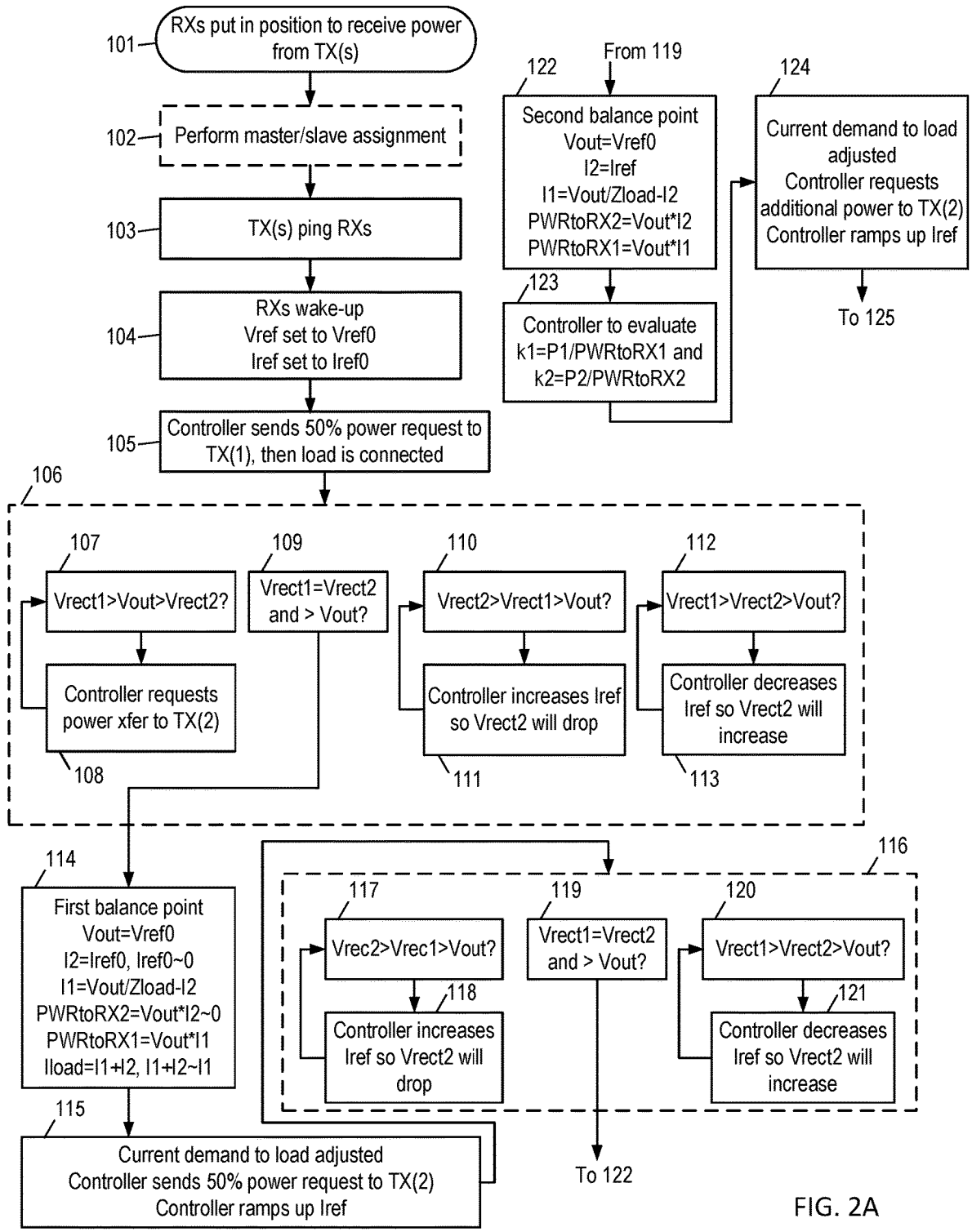
FIG. 2A is a flowchart illustrating operation of the wireless power transmission system of FIG. 1.
Figure 2B:
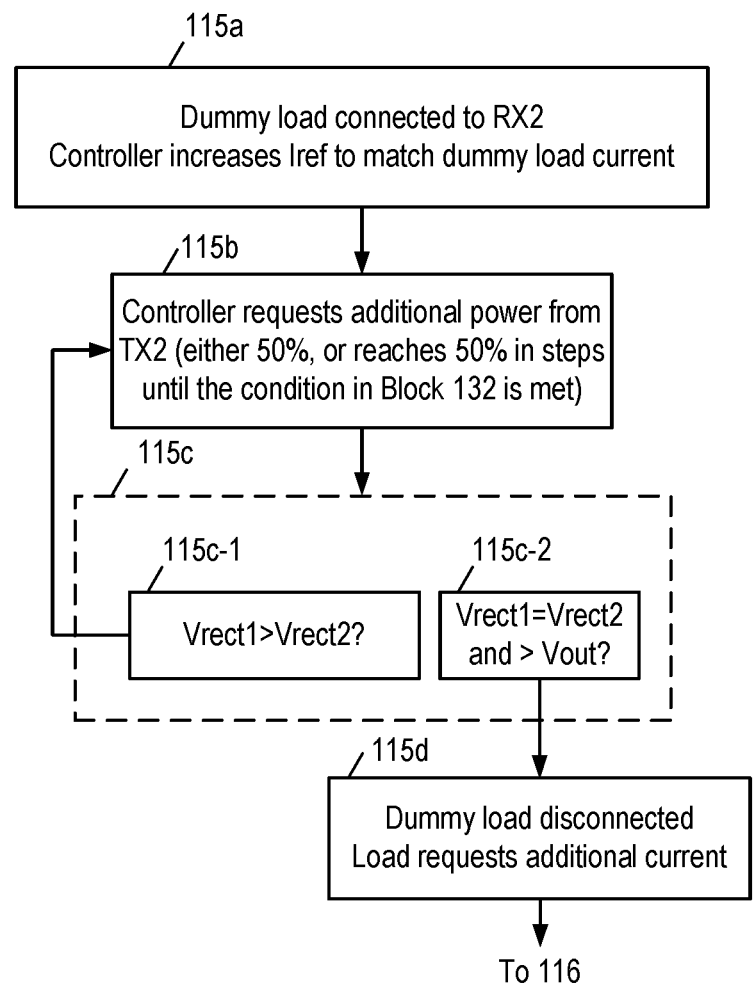
FIG. 2B is a flowchart illustrating details of step 115 of FIG. 2A.

Greater details of operation of the wireless power transmission system 1 are now described with additional reference to the flowchart of FIGS. 2A-2B that illustrate one potential operating technique for the wireless power transmission system 1, with it being understood that other operating techniques may also be used. To begin wireless power transmission, the receivers 6 and 8 are placed in position to receive power from the transmitters 5 and 7 (Block 101). For instance, if the receivers 6 and 8 are within a smartphone and the transmitters 5 and 7 are within a wireless charging pad, the smartphone here would be placed on the wireless charging pad.

Then, a master/slave assignment operation is performed (Block 102). In the instance shown in FIG. 1, the receiver 6 is configured as the master, while the receiver 8 is configured as the slave. Details on this master/slave assignment (Block 102) will be given below.

Next, the transmitters 5 and 7 ping the receivers 6 and 8 (Block 103), resulting in the receivers 6 and 8 waking up, the control unit 31 setting the reference current Iref to a set initial value, and hardware within the electronic device containing the system 1 setting the reference voltage Vref to a set initial value (Block 104). Then, the controller 31 sends a power request to the transmitter 5 via the receiver 6 using in-band or out-of-band data communication, and the load 15 is connected to node N3 (Block 105).

Thereafter, a first feedback loop process (Block 106) is performed so as to find a first balance point in which the output voltage Vout is approximately equal to the reference voltage Vref, the current I2 is approximately equal to the reference current Iref (which is set to approximately zero), the current I1 is approximately equal to the output voltage Vout divided by the impedance of the load 15, the power transmitted by the second transmitter 7 to the second receiver 8 is approximately equal to Vout*I2, the power transmitted by the first transmitter 5 to the first receiver 6 is approximately equal to Vout*I1, the current into the load is equal to I1+I2, and I1 is providing most of the load current while I2 is still approximately zero. The goal of the first feedback loop process is for the transmitter 5 to reach Vout=Vref output voltage and deliver approximately 50% of the power it is capable of delivering to the receiver 6, while the transmitter 7 is delivering a small amount of power for biasing receiver 8 and Vrect2 is actually balanced with Vrect1 level. In other words, when exiting the loop 106 the receiver 8 is receiving just enough power for being alive and supplied, without contributing yet to the load current, while receiver 6 does provide to the load 50% of what it is capable of.

The first feedback loop begins with the controller 31 reading the rectified voltages Vrect1 and Vrect2, and reading the output voltage Vout. If Vrect1 is greater than Vout and Vout is greater than Vrect2, then the controller 31 requests power transfer from the transmitter 7 to the receiver 8 (Block 108) by transmitting the request from the receiver 8 to the transmitter 7; in view of increasing Vrect2 as the incoming power to receiver 8 will at a point exceed the receiver's demand which is set to a low Iref value. Subsequently transmitter 7 power increases, the system will enter Block 112 or even Block 110 when the first feedback loop begins anew. On the other hand, if Vrect2 is greater than Vrect1 and Vrect1 is greater than Vout (Block 110), the controller 31 increases Iref, changing the operation of the amplifier 23 such that the n-channel transistor T2 increases I2 resulting in Vrect2 decreasing (Block 111), and the feedback loop begins anew. If, instead, Vrect1 is greater than Vrect2 and Vrect2 is greater than Vout (Block 112), the controller 31 decreases Iref, changing the operation of the amplifier 23 such that the n-channel transistor T2 decreases I2 resulting in Vrect2 increasing (Block 113), and the first feedback loop begins anew. Once Vrect1 is equal to Vrect2 and greater than Vout (Blok 109), the first balance point has been reached and the first feedback loop process is complete (Block 114).

After the first balance point is reached, then the controller 31 (acting as the Master) requests additional power be transmitted from the transmitter 7 to the receiver 8. In case of in-band communication, the controller 31 may not have capability to control the receiver 8 hardware communication channel to its associated transmitter 6. Therefore, the controller 31 may instruct the controller 32 to wake-up and do so. The controller 31 ramps up the reference current Iref accordingly (Block 115) to increase power delivery into the load 15. This ramp-up (Block 115) will be described in further detail below. After the ramp-up, a second feedback loop process begins (Block 116).

The second feedback loop is performed so as to find a second balance point in which the output voltage Vout is approximately equal to the reference voltage Vref, the current I2 is approximately equal to the reference current Iref, the current I1 is approximately equal to the output voltage Vout divided by the load impedance Zload with the current I2 being subtracted from the result, the power transmitted by the second transmitter 7 to the second receiver 8 is approximately equal to Vout*I2, and the power transmitted by the first transmitter 5 to the first receiver 6 is approximately equal to Vout*I1 (Block 122). The goal of the second feedback loop process is for the transmitters 5 and 7 to each deliver approximately 50% of the power they are capable of delivering to the receivers 6 and 8.

The second feedback loop begins with the controller 31 reading the rectified voltages Vrect1 and Vrect2, and reading the output voltage Vout. If Vrect2 is greater than Vrect1 and Vrect1 is greater than Vout (Block 117), then the controller 31 increases Iref, changing the operation of the amplifier 23 such that the n-channel transistor T2 increases I2 resulting in Vrect2 decreasing (Block 118), and the second feedback loop begins anew. If, instead, Vrect1 is greater than Vrect2 and Vrect2 is greater than Vout (Block 120), the controller 31 decreases Iref, changing the operation of the amplifier 23 such that the n-channel transistor T2 decreases I2 resulting in Vrect2 increasing (Block 121), and the second feedback loop begins anew. Once Vrect1 is equal to Vrect2 and greater than Vout (Block 119), the second balance point has been reached and the second feedback loop process is complete (Block 122).

After the second balance point is reached, then the controller 31 evaluates a value k1, calculated as the power delivered to the receiver 6 divided by the power transmitted by the transmitter 5, and a value k2, calculated as the power delivered to the receiver 8 divided by the power transmitted by the transmitter 7 (Block 123). These values of k1 and k2 may be stored and used at step 102 (at the next time the system 1 is used) to determine the master/slave assignment—whichever receiver 6 or 8 has the higher k value can be set as the master at step 102.

Thereafter, the controller 31 may instruct controller 32 to request additional power be transmitted from the transmitter 7 to the receiver 8. It may also directly send power request to any of the two transmitters in case of out-of-band communication. The controller 31 ramps up the reference current Iref accordingly (Block 124). This ramp-up (Block 124) will be described in detail below, and serves to bring transmitters 5 and 7 to be transmitting 100% of the power they are capable of transmitting to the receivers 6 and 8. After the ramp-up, a third balance point is reached in which the output voltage Vout is approximately equal to the reference voltage Vref, the current I2 is approximately equal to the reference current Iref, the current I1 is approximately equal to the output voltage Vout divided by the load impedance Zload with the current I2 being subtracted from the result, the power transmitted by the second transmitter 7 to the second receiver 8 is approximately equal to Vout*I2, and the power transmitted by the first transmitter 5 to the first receiver 6 is approximately equal to Vout*I1 (Block 125). Thereafter, the transmitters 5 and 7 will each be delivering 100% of the power they are capable of delivering to the receivers 6 and 8, and further adjustment is not needed. Power transfer continues to occur until the battery within the electronic device is fully charged or until the receivers 6 and 8 are no longer in proximity to the transmitters 5 and 7, for example by the electronic device being removed from the charging pad.

It should be appreciated that in some instances, it may not be possible for the currents I1 and I2 to be equalized, and therefore it may not be possible for the transmitters 5 and 7 to each reach 100% of their potential power output, and may not be possible for the receivers 6 and 8 to each reach 100% of their potential power output to the load 115. However, the above described feedback loops will still function to balance the rectified voltages Vrect1 and Vrect2, allowing each transmitter 5 and 7 to deliver different amounts of power.

3. Detailed Description of Step 115

Step 115 includes three events which are to happen simultaneously. The load demand adjusts to a higher value while the transmitter provides the additional required power and the control unit adjusts the Iref to help ensure smooth transition. It involves three independent items of hardware and time constants, and could result in Vrect excessively increasing or dropping without proper synchronization between the demand, the supply and the balancing. Step 115 breaks this process in 2 phases. In the first instance, the power demand and Iref adjustment (supply & balancing) are performed while a dummy load is connected (steps 115a, 115b, 115c), which now allows simultaneously handling two items of hardware—transmitter & receiver—and more easily manage the sequencing as the dummy load is part of the receiver which is the one to instruct to the transmitter. Once the system stabilized in first instance, at second instance (step 115d), the dummy load is disconnected and the actual load demand is set which allows dealing again with the two items of hardware at a time, the receiver and its load, which could be for example a host in case of a battery charger.

The power request by the controller 31 for the transmitter 7 to send 50% of the power it is capable of delivering to the receiver 8 (Block 115) is now further described with additional reference to FIG. 2B. First, a dummy load is connected to the receiver 8, and the controller 31 increases the reference current Iref to match the current through the dummy load (Block 115a).

Then, the controller 31 requests (or instructs controller 32 to do so in case of in-band communication) that the second transmitter 7 deliver additional power to the second receiver 8. In particular the controller 31 requests that the second transmitter deliver up to 50% of the power that it is capable of delivering to the receiver 8 (Block 115b). Then, the controller 31 reads the rectified voltages Vrect1 and Vrect2, as well as the output voltage Vout (Block 115c). If Vrect1 is greater than Vrect2 (which occurs if the controller 31 requested less than 50% power from the second transmitter 7, at Block 115c-1), then the controller 31 once again requests additional power from the second transmitter 7 (Block 115b). Once Vrect1 is equal to Vrect2 and greater than Vout (Block 115c-2), then the controller 31 disconnects the dummy load after making sure that the actual load requested the same amount of power (receiver to host transaction though I2C for example), resulting in the load 15 actually requesting additional current (Block 115d).

4. Detailed Description of Step 124

Figure 2C:
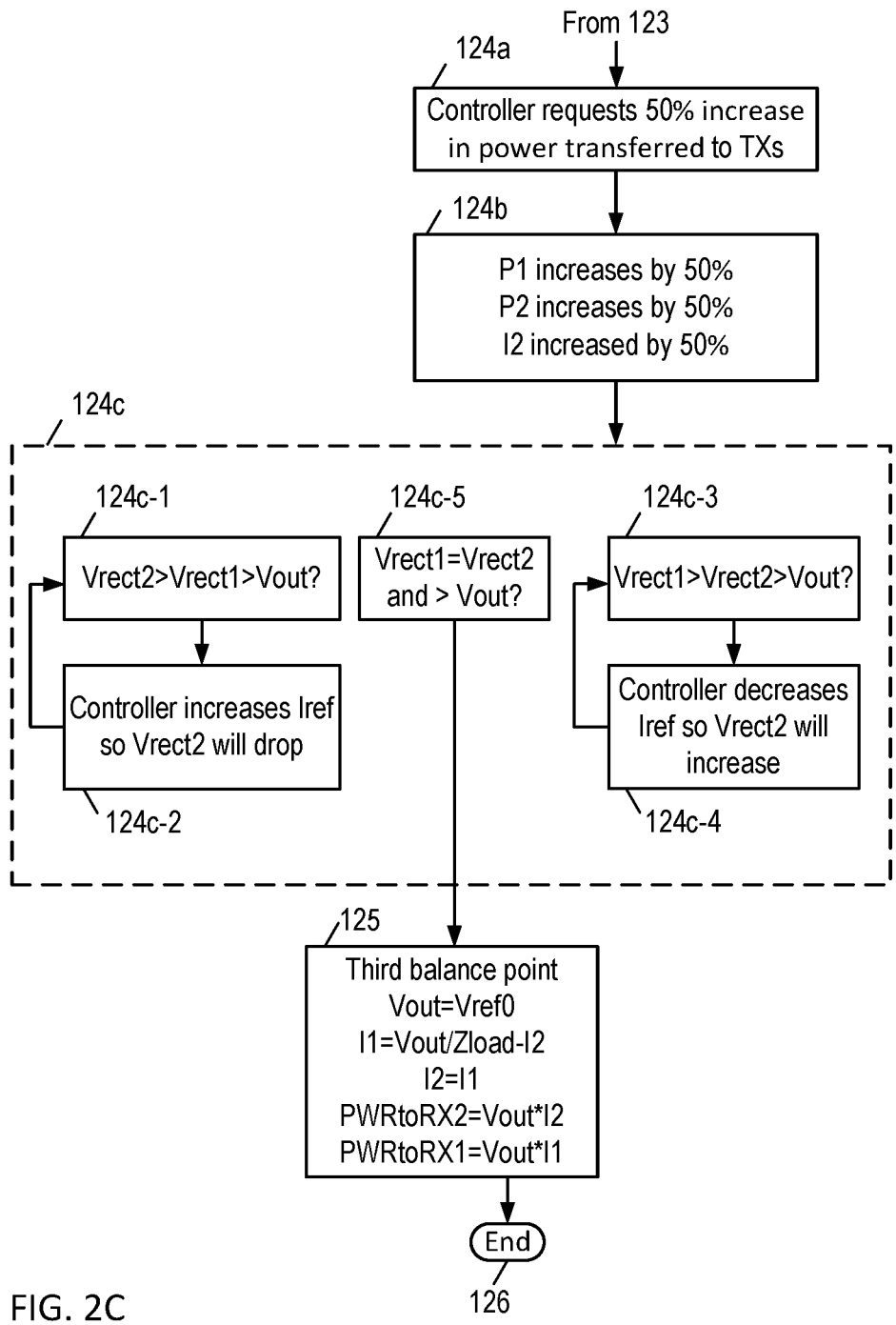
FIG. 2C is a flowchart illustrating details of step 124 of FIG. 2A.

The power request by the controller 31 for the transmitters 5 and 7 to increase the power they are delivering to the receivers 6 and 8 (Block 124) is now described with additional reference to FIG. 2C. First, as stated, the controller 31 requests the transmitters 5 and 7 (either directly through out-of-band communication, or via the controller 32) to increase the power they are delivering to the receivers 6 and 8 by 100% so that they are delivering the maximum power they can deliver (Block 124a). Therefore, the power delivered by the transmitter 5 is increased by 100%, the power delivered by the transmitter 7 is increased by 100% and the current I2 accordingly increases by 100% (Block 124b). Thereafter, a third feedback loop process is performed (Block 124c).

The third feedback loop is performed so as to find a third balance point in which the output voltage Vout is approximately equal to the reference voltage Vref, the current I2 is approximately equal to the reference current Iref, the current I1 is approximately equal to the output voltage Vout divided by the load impedance Zload with the current I2 being subtracted from the result, the power transmitted by the second transmitter 7 to the second receiver 8 is approximately equal to Vout*I2, and the power transmitted by the first transmitter 5 to the first receiver 6 is approximately equal to Vout*I1 (Block 124c). The goal of third feedback loop process is for the transmitters 5 and 7 to each deliver 100% of the power they are capable of delivering to the receivers 6 and 8.

The third feedback loop begins with the controller 31 reading the rectified voltages Vrect1 and Vrect2, and reading the output voltage Vout. If Vrect2 is greater than Vrect1 and Vrect1 is greater than Vout (Block 124c-1), then the controller 31 increases Iref, changing the operation of the amplifier 23 such that the n-channel transistor T2 increases I2 resulting in Vrect2 decreasing (Block 124c-2), and the third feedback loop begins anew. If, instead, Vrect1 is greater than Vrect2 and Vrect2 is greater than Vout (Block 124c-3), the controller 31 decreases Iref, changing the operation of the amplifier 23 such that the n-channel transistor T2 decreases I2 resulting in Vrect2 increasing (Block 124c-4), and the third feedback loop begins anew. Once Vrect1 is equal to Vrect2 and greater than Vout (Block 125c-5), the third balance point has been reached and the third feedback loop process is complete (Block 133).

5. Detailed Description of Step 102

Figures 2D, 2E:
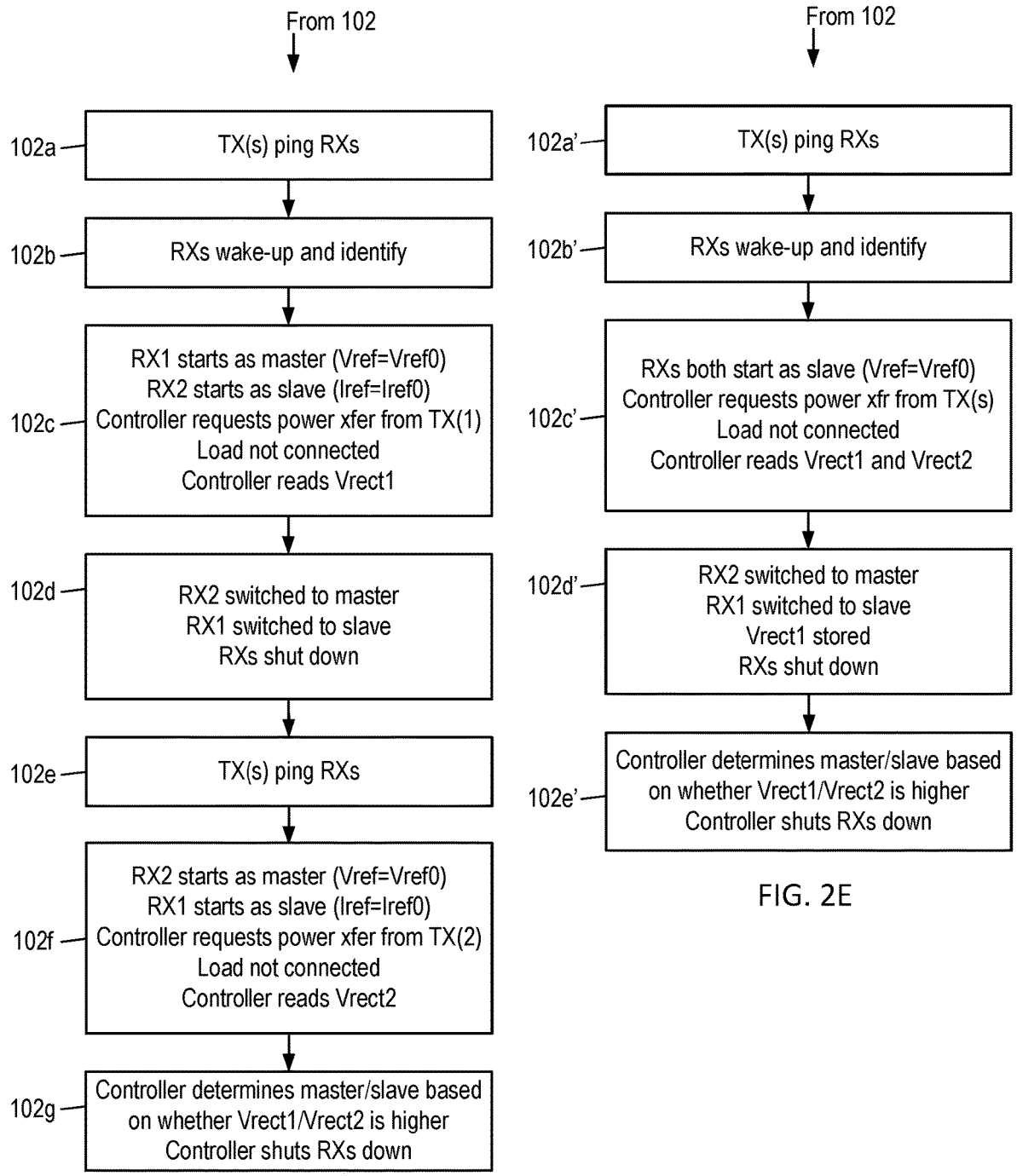
FIG. 2D is a flowchart illustrating details of one technique for performing step 102 of FIG. 2A.
FIG. 2E is a flowchart illustrating details of another technique for performing step 102 of FIG. 2A.

The master/slave assignment operation (Block 102) is now described in detail with additional reference to FIG. 2D. Initially, the transmitters 5 and 7 ping the receivers 6 and 8 (Block 102a), and the receivers 6 and 8 in turn wake up and identify themselves to the controller 31 (Block 102b). Initially, the first receiver 5 starts as the master and the reference voltage Vref is set to an initial startup value, and the second receiver 7 starts as the slave and the reference current Iref is set to an initial startup value, and the controller 31 requests power transfer from the transmitter 5 to the receiver 6 while the load 15 is not yet connected to node N3 and the controller reads the rectified voltage Vrect1 (Block 102c) and stores the value of Vrect1. When the receiver 6 is set as the master, it has the electrical components and connections it is shown as having in FIG. 1. When the receiver 8 is set as the slave, it has the electrical components and connections it is shown as having in FIG. 1.

Next, the receiver 8 is switched to be the master and the receiver 6 is switched to be the slave, and the receivers 6 and 8 are thereafter shut down (Block 102d). Here, note that by setting the receiver 8 to be the master, the receiver 8 has the same electrical components and connections as the receiver 6 is shown as having in FIG. 1, and by setting the receiver 6 to be the slave, the receiver 6 has the same electrical components and connections as the receiver 8 is shown as having in FIG. 1.

Now, the transmitters 5 and 7 again ping the receivers 6 and 8 (Block 102e), Vref and Iref are reinitialized to their initial startup values, the load 15 is still not connected to node N3, the controller 31 requests power transfer from the transmitter 7 to the receiver 8, and the controller 31 reads the rectified voltage Vrect2 (Block 102f) and stores the value of Vrect2. Finally, the controller 31 determines which receiver 6 or 8 is to be the master and which is to be the slave based upon whether Vrect1 or Vrect2 is higher (Block 102g). It is to be noted that along with the Master/Slave assessment the control turns the receivers on and off. Therefore as for being able to keep trace of Master/Slave assignment, the receivers should either embed NVM capability or either use the host memory capability for storing and retrieving the information.

An alternative technique for the master/slave assignment operation (Block 102) is now described in detail with additional reference to FIG. 2E. Initially, the transmitters 5 and 7 ping the receivers 6 and 8 (Block 102a'), and the receivers 6 and 8 in turn wake up and identify themselves to the controller 31 (Block 102b'). Here, both receivers 6 and 8 are initially started in the slave configuration (e.g., both have the same electrical components and connections as the receiver 8 is shown as having in FIG. 1), the load 15 is not connected to node N3, and the controller 31 requests power transfer to the receivers 6 and 8 from the transmitters 5 and 7 while reading Vrect1 and Vrect2 and storing their values (Block 102c').

Thereafter, the receiver 8 is switched to be the master and the receiver 7 is switched to be the slave, the controller 31 requests power transfer to the receivers 6 and 8 from the transmitters 5 and 7 while reading Vrect1 and storing its value (Block 102d').

Then, the receivers 6 and 8 are shut down. The controller 31 then determines which receiver 6 or 8 is to be the master and which is to be the slave based upon whether Vrect1 or Vrect2 is higher (Block 102e') at Block 102c', and whether Vrect2 from Block 102c' is higher than Vrect1 from Block 102d'.

C. Alternative Hardware, Wireless Power Transmission System 1'

Figure 3:
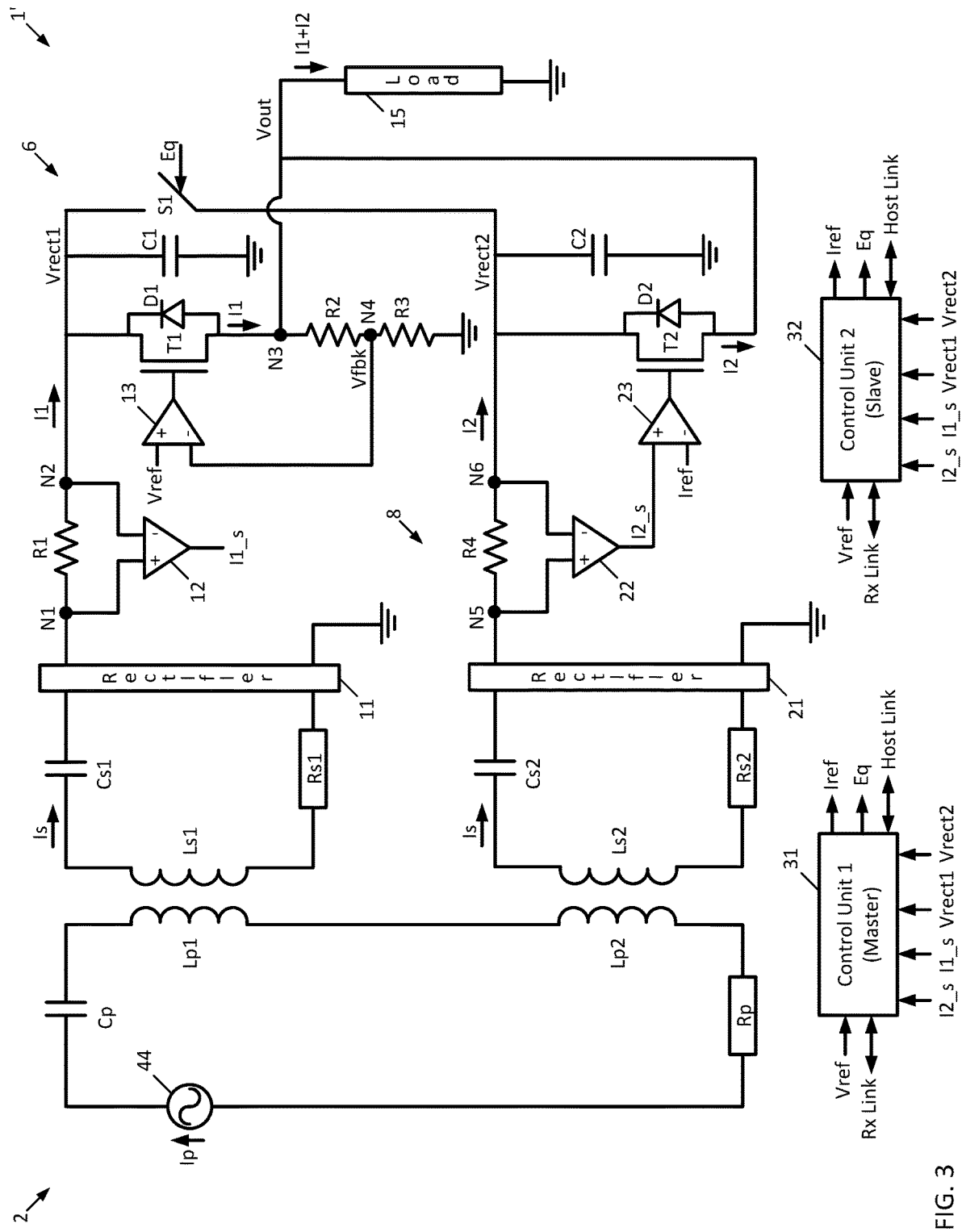
FIG. 3 is a schematic diagram of a second wireless power transmission system disclosed herein in which a single transmitter transmits power to two receivers operating in parallel.

Now described with reference to FIG. 3 is a second embodiment of wireless transmission system 1' in which a single transmitter 2 wirelessly transmits power to first and second receivers 6 and 8 operating in parallel. The transmitter 2 is comprised of an AC power source 44 connected to a primary coil (schematically represented by capacitance Cp in series with inductor Lp and resistance Rp).

The receivers 6 and 8 are as described above.

D. Operation of Wireless Power Transmission System 1'

Operation of the wireless power transmission system 1' proceeds the same as the wireless power transmission system 1 as described above, except that the transmitter 2 is turned on when either of the transmitters 5 or 7 is turned on, that the transmitter 2 is turned off when both of the transmitters 5 and 7 are turned off.

E. Additional Alternative Hardware Configurations

While the cases of one transmitter paired with two receivers, and two transmitters paired with two receivers, has been shown, it should be appreciated that other configurations are possible. For example, there may be three or more receivers, with one receiver acting as a master (and performing the functions described above), and the other two or more receivers acting as slaves (and performing the functions described above).

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A wireless power transmission system, comprising:
   at least one wireless power transmission circuit;
   a first wireless power reception circuit comprising a first amplifier circuit configured to compare a reference voltage to a feedback voltage representative of a voltage at an output node produced from power received from the at least one wireless power transmission circuit, and adjust a first transistor sourcing a first rectified current until the feedback voltage is equal to the reference voltage, wherein the first rectified current is delivered to an output node;
   a second wireless power reception circuit comprising a second amplifier circuit configured to modify a gate bias for a second transistor sourcing a second rectified current produced from power received from the at least one wireless power transmission circuit to thereby modify the second rectified current based upon a comparison of a reference current to a current representative of the second rectified current, wherein the second rectified current is delivered to the output node; and
   control circuitry configured to adjust the reference current until a first rectified voltage generated by the first wireless power reception circuit and a second rectified voltage generated by the second wireless power reception circuit are equal.

2. The wireless power transmission system of claim 1, wherein the first wireless power reception circuit further comprises a first capacitor configured to store the first rectified voltage; and wherein the second wireless power reception circuit further comprises a second capacitor configured to store the second rectified voltage.

3. The wireless power transmission system of claim 1, wherein the first amplifier circuit comprises:
   a first transistor having a drain coupled to receive the first rectified voltage, a source coupled to an output node, and a gate;
   a voltage divider coupled between the output node and ground; and
   a first amplifier having a non-inverting terminal coupled to the reference voltage, an inverting terminal coupled to a tap of the voltage divider to receive the feedback voltage, and an output coupled to the gate of the first transistor.

4. The wireless power transmission system of claim 3, wherein the second amplifier circuit comprises:
   a second transistor having a drain coupled to the second rectified voltage, a source coupled to the output node, and a gate; and
   a second amplifier having a non-inverting terminal coupled to receive the current representative of the second rectified current, an inverting terminal coupled to receive the reference current, and an output coupled to the gate of the second transistor.

5. The wireless power transmission system of claim 4, further comprising an equalizer switch controlled by the control circuitry to selectively couple the first rectified voltage to the second rectified voltage when the control circuitry is unable to adjust the reference current until the first and second rectified voltages are equal.

6. The wireless power transmission system of claim 1, wherein the first amplifier circuit comprises a low dropout amplifier.

7. The wireless power transmission system of claim 1, wherein the control circuitry adjusts the reference current until the first rectified voltage and the second rectified voltage are equal by:
   requesting that the at least one wireless power transmission circuit transmit, to the first wireless power reception circuit, a portion of power it is capable of transmitting; and
   adjusting the reference current until a first balance point, at which the first and second rectified voltages are equal, is reached by:
      requesting that the at least one wireless power transmission circuit increase the portion of its power that it is transmitting to the first wireless power reception circuit if the first rectified voltage is greater than an output voltage at the output node and if the output voltage is greater than the second rectified voltage;
      increasing a magnitude of the reference current if the second rectified voltage is greater than the first rectified voltage and the first rectified voltage is greater than the output voltage; and
      decreasing the magnitude of the reference current if the first rectified voltage is greater than the second rectified voltage and the second rectified voltage is greater than the output voltage.

8. The wireless power transmission system of claim 7, wherein the control circuitry adjusts the reference current until the first rectified voltage and the second rectified voltage are equal by additionally:
   requesting that the at least one wireless power transmission circuit transmit, to the second wireless power reception circuit, a portion of power it is capable of transmitting; and
   adjusting the reference current until a second balance point, at which the first and second rectified voltages are equal, is reached by:
      increasing a magnitude of the reference current, if the second rectified voltage is greater than the first rectified voltage and the first rectified voltage is greater than the output voltage; and
      decreasing the magnitude of the reference current if the first rectified voltage is greater than the second rectified voltage and the second rectified voltage is greater than the output voltage.

9. The wireless power transmission system of claim 8, wherein the control circuitry adjusts the reference current until the first rectified voltage and the second rectified voltage are equal by additionally:
   requesting that the at least one wireless power transmission circuit transmit, to the first and second wireless power reception circuits, all of power it is capable of transmitting; and
   adjusting the reference current until a third balance point, at which the first and second rectified voltages are equal, is reached by:
      increasing a magnitude of the reference current, if the second rectified voltage is greater than the first rectified voltage and the first rectified voltage is greater than the output voltage; and
      decreasing the magnitude of the reference current if the first rectified voltage is greater than the second rectified voltage and the second rectified voltage is greater than the output voltage.

10. A wireless power transmission system, comprising:
at least one wireless power transmission circuit;
a master wireless power reception circuit comprising a voltage reference circuit configured to adjust an output voltage at an output node until a feedback voltage is equal to a reference voltage, wherein the feedback voltage is representative of a first output voltage produced from power received from the at least one wireless power transmission circuit; and
a plurality of slave wireless power reception circuits, each comprising a current reference circuit configured to adjust a respective rectified current produced from power received from the at least one wireless power transmission circuit by that slave wireless power reception circuit and delivered to the output node until a first rectified voltage generated by the master wireless power reception circuit and a second rectified voltage generated by that slave wireless power reception circuit are equal.

11. The wireless power transmission system of claim 10, wherein the master wireless power reception circuit further comprises a first capacitor across which the first rectified voltage forms; and wherein each wireless power reception circuit further comprises a second capacitor across which the second rectified voltage forms.

12. The wireless power transmission system of claim 10, wherein the voltage reference circuit comprises:
a three terminal device or set of devices having a first terminal coupled to receive the first rectified voltage, a second terminal coupled to an output node, and a control terminal;
a voltage divider coupled between the output node and ground; and
a first amplifier having a non-inverting terminal coupled to the reference voltage, an inverting terminal coupled to a tap of the voltage divider to receive the feedback voltage, and an output coupled to the control terminal of the three terminal device or set of devices.

13. The wireless power transmission system of claim 12, wherein each current sourcing circuit comprises:
a three terminal device or set of devices having a first terminal coupled to the second rectified voltage, a second terminal coupled to the output node, and a control terminal; and
a second amplifier having a non-inverting terminal coupled to receive a current representative of the rectified current, an inverting terminal coupled to receive a reference current, and an output coupled to the control terminal of the three terminal device or set of devices of the current sourcing circuit.

14. The wireless power transmission system of claim 13, further comprising an equalizer switch to selectively couple the first rectified voltage to the second rectified voltage when the current reference circuit is unable to adjust the reference current until the first and second rectified voltages are equal.

15. A method of wireless transmitting power, the method comprising:
causing at least one power transmission circuit to transmit, to a master wireless power reception circuit, a portion of power it is capable of transmitting;
adjusting operation of at least one slave wireless power reception circuit until a first rectified voltage produced by the master wireless power reception circuit and a second rectified voltage produced by the at least one slave wireless power reception circuit are equal by:
requesting that the at least one power transmission circuit increase the portion of its power that it is transmitting to the master wireless power reception circuit if the first rectified voltage is greater than an output voltage at an output node and if the output voltage is greater than the second rectified voltage;
adjusting operation of the at least one slave wireless power reception circuit if the second rectified voltage is greater than the first rectified voltage and the first rectified voltage is greater than the output voltage; and
adjusting operation of the at least one slave wireless power reception circuit if the first rectified voltage is greater than the second rectified voltage and the second rectified voltage is greater than the output voltage.

16. The method of claim 15, wherein the operation of a plurality of slave wireless power reception circuits are adjusted until the first rectified voltage and second rectified voltages produced by each of the plurality of slave wireless power reception circuits are equal by:
requesting that the at least one power transmission circuit increase the portion of its power that it is transmitting to the master wireless power reception circuit if the first rectified voltage is greater than an output voltage at an output node and if the output voltage is greater than the second rectified voltages;
adjusting operation of the plurality of slave wireless power reception circuits if the second rectified voltages are greater than the first rectified voltage and the first rectified voltage is greater than the output voltage; and
adjusting operation of the plurality of slave wireless power reception circuits if the first rectified voltage is greater than the second rectified voltages and the second rectified voltages are greater than the output voltage.

\* \* \* \* \*

UNITED STATES PATENT AND TRADEMARK OFFICE
CERTIFICATE OF CORRECTION

| | |
|---|---|
| PATENT NO. | : 11,128,170 B1 |
| APPLICATION NO. | : 16/897429 |
| DATED | : September 21, 2021 |
| INVENTOR(S) | : Yannick Guedon |

It is certified that error appears in the above-identified patent and that said Letters Patent is hereby corrected as shown below:

In the Specification

At Column 2, Line Nos. 63-64, please replace the phrase [[ transmitting to the first wireless power reception ]] with the phrase -- transmitting to the second wireless power reception --.

In the Claims

Claim No. 7, Column 14, Line No. 17, please replace the phrase [[ the first wireless power ]] with the phrase -- the second wireless power --.

Claim No. 15, Column 16, Line No. 16, please replace the phrase [[ to the master wireless ]] with -- to the at least one slave wireless --.

Claim No. 16, Column 16, Line No. 37, please replace the phrase [[ to the master wireless ]] with -- to the at least one slave wireless --.

Signed and Sealed this
Sixteenth Day of August, 2022

Katherine Kelly Vidal
*Director of the United States Patent and Trademark Office*